(12) United States Patent
Mayo

(10) Patent No.: US 9,112,340 B2
(45) Date of Patent: Aug. 18, 2015

(54) SIDE WALL BRACKET FOR CABLE TRAY

(71) Applicant: Panduit Corp., Tinley Park, IL (US)

(72) Inventor: Michael Mayo, New Lenox, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 14/171,891

(22) Filed: Feb. 4, 2014

(65) Prior Publication Data

US 2014/0216809 A1 Aug. 7, 2014

Related U.S. Application Data

(60) Provisional application No. 61/761,990, filed on Feb. 7, 2013.

(51) Int. Cl.
| | |
|---|---|
| H02B 1/40 | (2006.01) |
| A47F 7/00 | (2006.01) |
| A47F 5/00 | (2006.01) |
| A47F 5/14 | (2006.01) |

(Continued)

(52) U.S. Cl.
CPC .............. H02G 3/0437 (2013.01); A47B 55/02 (2013.01); A47B 57/581 (2013.01); A47F 5/005 (2013.01); A47F 5/01 (2013.01); A47F 5/13 (2013.01); H02G 3/0443 (2013.01)

(58) Field of Classification Search
CPC ......... H02G 3/02; H02G 3/06; H02G 3/0608; H02G 3/0437; H02G 3/0443; H02G 3/22; A47F 5/005; A47F 5/01; A47F 5/0892; A47F 5/14; A47F 5/0031; A47F 5/13; A47F 7/144; A47F 7/148; A47F 3/147; A47B 55/02; A47B 43/006; A47B 43/003; A47B 87/001; A47B 57/58; A47B 57/581; A47B 96/04; A47B 2051/005; A47B 73/002; A47B 65/00; A47B 65/10; A47B 65/15
USPC ............. 211/117, 26, 181.1, 184, 119, 126.9, 211/90.03, 41.4, 133.2, 133.5; 248/68.1, 248/73, 58; 174/503, 95, 481
See application file for complete search history.

(56) References Cited

U.S. PATENT DOCUMENTS 2,814,390 A * 11/1957 Barbier ...................... 211/126.9
2,850,172 A * 9/1958 Beckner ....................... 108/107

(Continued)

FOREIGN PATENT DOCUMENTS

| EP | 0191667 A1 | 8/1986 |
|---|---|---|
| EP | 1193821 A1 | 4/2002 |

(Continued)

*Primary Examiner* — Jennifer E Novosad
(74) *Attorney, Agent, or Firm* — Christopher S. Clancy; Aimee E. McVady

(57) ABSTRACT

A cable tray and at least one side wall bracket secured to the cable tray is disclosed. The cable tray has a plurality of transverse and longitudinal wires. The side wall bracket has an upper loop with a first end and a second end. Curved portions extend from the first end and the second end of the upper loop. An angled leg extends from each curved portion. The angled legs are defined by a U-shaped inside leg portion and a hook that leads to an outside leg portion. The inside leg portion of each angled leg engages a first surface of side longitudinal wires and bottom longitudinal wires and the outside leg portion of each angled leg engages a second surface opposite the first surface of side longitudinal wires and bottom longitudinal wires to secure the side wall bracket to the cable tray.

9 Claims, 6 Drawing Sheets

(51) Int. Cl.
　　　*H02G 3/04*　　(2006.01)
　　　*A47F 5/01*　　(2006.01)
　　　*A47F 5/13*　　(2006.01)
　　　*A47B 55/02*　(2006.01)
　　　*A47B 57/58*　(2006.01)

(56) References Cited

U.S. PATENT DOCUMENTS

| | | | |
|---|---|---|---|
| 3,082,879 A * | 3/1963 | Wilson | 211/126.8 |
| 3,704,791 A | 12/1972 | Young, Jr. | |
| 4,079,836 A * | 3/1978 | Von Stein et al. | 206/513 |
| 5,384,937 A | 1/1995 | Simon | |
| 6,023,024 A | 2/2000 | Stjerneby | |
| 6,341,704 B1 * | 1/2002 | Michel, Jr. | 211/181.1 |
| 6,409,031 B1 * | 6/2002 | Wynne | 211/119 |
| 6,427,400 B1 * | 8/2002 | Greenblatt | 52/220.5 |
| 6,497,331 B1 * | 12/2002 | Morandi | 211/153 |
| 6,595,120 B1 * | 7/2003 | Tiemann | 99/426 |
| 6,637,704 B2 * | 10/2003 | Jette | 248/49 |
| D577,256 S * | 9/2008 | Schutte | D7/409 |
| 7,546,987 B2 | 6/2009 | Sinkoff | |
| 7,798,341 B2 * | 9/2010 | Richardson et al. | 211/119 |
| 7,959,019 B2 | 6/2011 | Jette | |
| 8,097,808 B2 | 1/2012 | Quertelet et al. | |
| 8,424,814 B2 | 4/2013 | Davis et al. | |
| 8,757,559 B2 * | 6/2014 | Davis et al. | 248/49 |
| 2003/0116682 A1 | 6/2003 | Finco et al. | |
| 2005/0040295 A1 * | 2/2005 | Sinkoff | 248/58 |
| 2007/0029451 A1 * | 2/2007 | Spagnoli et al. | 248/49 |
| 2009/0008512 A1 * | 1/2009 | Davis et al. | 248/49 |
| 2010/0126950 A1 | 5/2010 | Winn | |
| 2010/0230551 A1 * | 9/2010 | Kellerman | 248/58 |
| 2011/0006022 A1 * | 1/2011 | Caveney et al. | 211/133.5 |
| 2011/0284283 A1 * | 11/2011 | Davis et al. | 174/481 |
| 2011/0284701 A1 | 11/2011 | Brouwer et al. | |
| 2011/0286785 A1 | 11/2011 | Brouwer et al. | |
| 2012/0068032 A1 * | 3/2012 | Stockman | 248/225.21 |
| 2012/0318758 A1 | 12/2012 | Caveney et al. | |
| 2014/0151513 A1 * | 6/2014 | Valdes Colina | 248/49 |
| 2014/0216809 A1 * | 8/2014 | Mayo | 174/503 |
| 2014/0224515 A1 * | 8/2014 | Rouleau | 174/43 |

FOREIGN PATENT DOCUMENTS

| | | |
|---|---|---|
| EP | 1727252 A1 | 11/2006 |
| EP | 1793464 A1 | 6/2007 |
| WO | 2005090845 A1 | 9/2005 |
| WO | 2008111888 A1 | 9/2008 |

\* cited by examiner

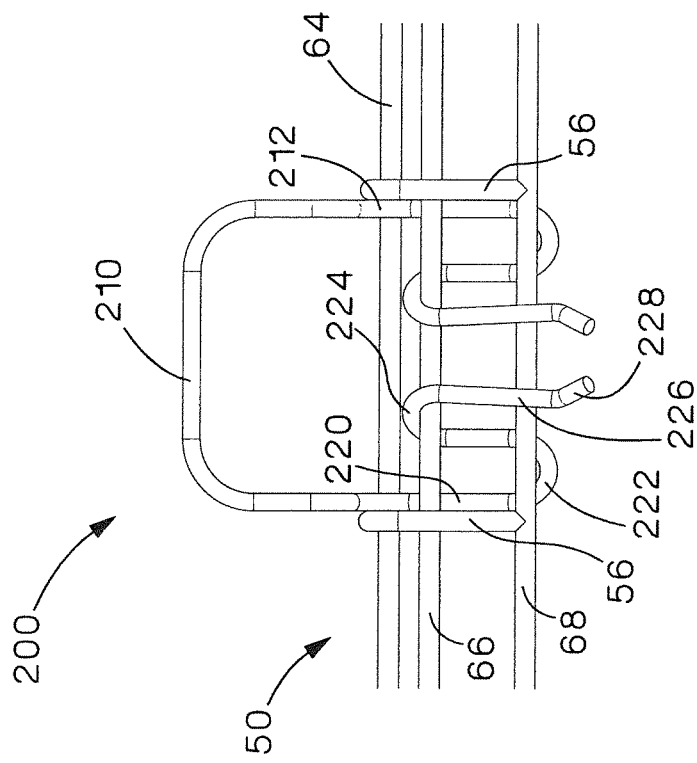
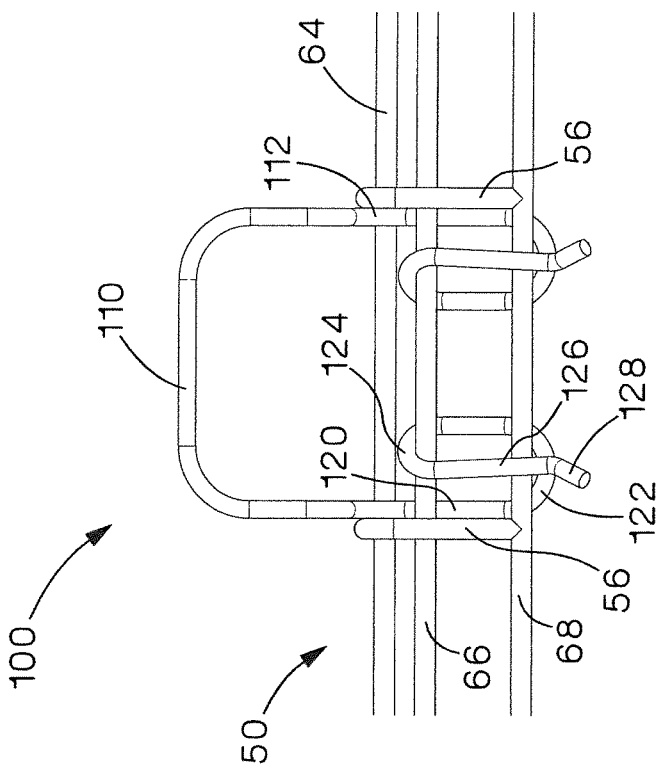

SIDE WALL BRACKET FOR CABLE TRAY

CROSS-REFERENCE TO RELATED APPLICATIONS

This application claims priority to U.S. Provisional Application Ser. No. 61/761,990, filed Feb. 7, 2013, the subject matter of which is hereby incorporated by reference in its entirety.

FIELD OF THE INVENTION

The present invention is directed to a cable routing system, and more particularly, to a side wall bracket for cable trays in a cable routing system.

BACKGROUND OF THE INVENTION

Overhead cable routing systems typically include a cable basket or a cable duct. The cable basket or cable duct includes integral sidewalls. Various routing devices are installed on the cable basket or cable duct during installation. Often the sidewalls of the cable basket or cable duct need to be cut when a tee, cross or right angle pathway is created. As a result, installation of the typical cable basket or cable duct pathway is time consuming, costly and creates sharp edges.

Applicant invented a new cable routing system that has been described in Applicant's U.S. Patent Publication Nos. 2011/0284283; 2011/0284701; and 2011/0286785 and U.S. Pat. No. 8,424,814. The cable tray described in the pending patent applications includes longitudinal wires and transverse wires with downwardly extending sidewalls. Various devices may be added to the cable tray to form the cable routing system.

It would be desirable to provide removable side walls that are easily installed on the cable tray to retain the plurality of cables routed on the tray.

SUMMARY OF THE INVENTION

The present invention is directed to a cable tray and at least one side wall bracket secured to the cable tray. The side wall bracket retains cables routed on the cable tray. The cable tray includes a plurality of transverse wires with a top portion and downwardly extending side walls. The cable tray also includes a plurality of longitudinal wires positioned underneath the top portion, side longitudinal wires and bottom longitudinal wires. The side wall bracket has an upper loop with a first end and a second end. Curved portions extend from the first end and the second end of the upper loop. An angled leg extends from each curved portion. The angled legs are defined by a U-shaped inside leg portion and a hook that leads to an outside leg portion. The inside leg portion of each angled leg engages a first surface of the side longitudinal wires and the bottom longitudinal wires and the outside leg portion of each angled leg engages a second surface opposite the first surface of the side longitudinal wires and the bottom longitudinal wires to secure the side wall bracket to the cable tray.

BRIEF DESCRIPTION OF THE DRAWINGS

FIG. 8 is a front view of the side wall bracket of FIG. 2 installed on the cable tray.
FIG. 9 is a front view of an alternative side wall bracket installed on the cable tray.

DETAILED DESCRIPTION

Figure 1:
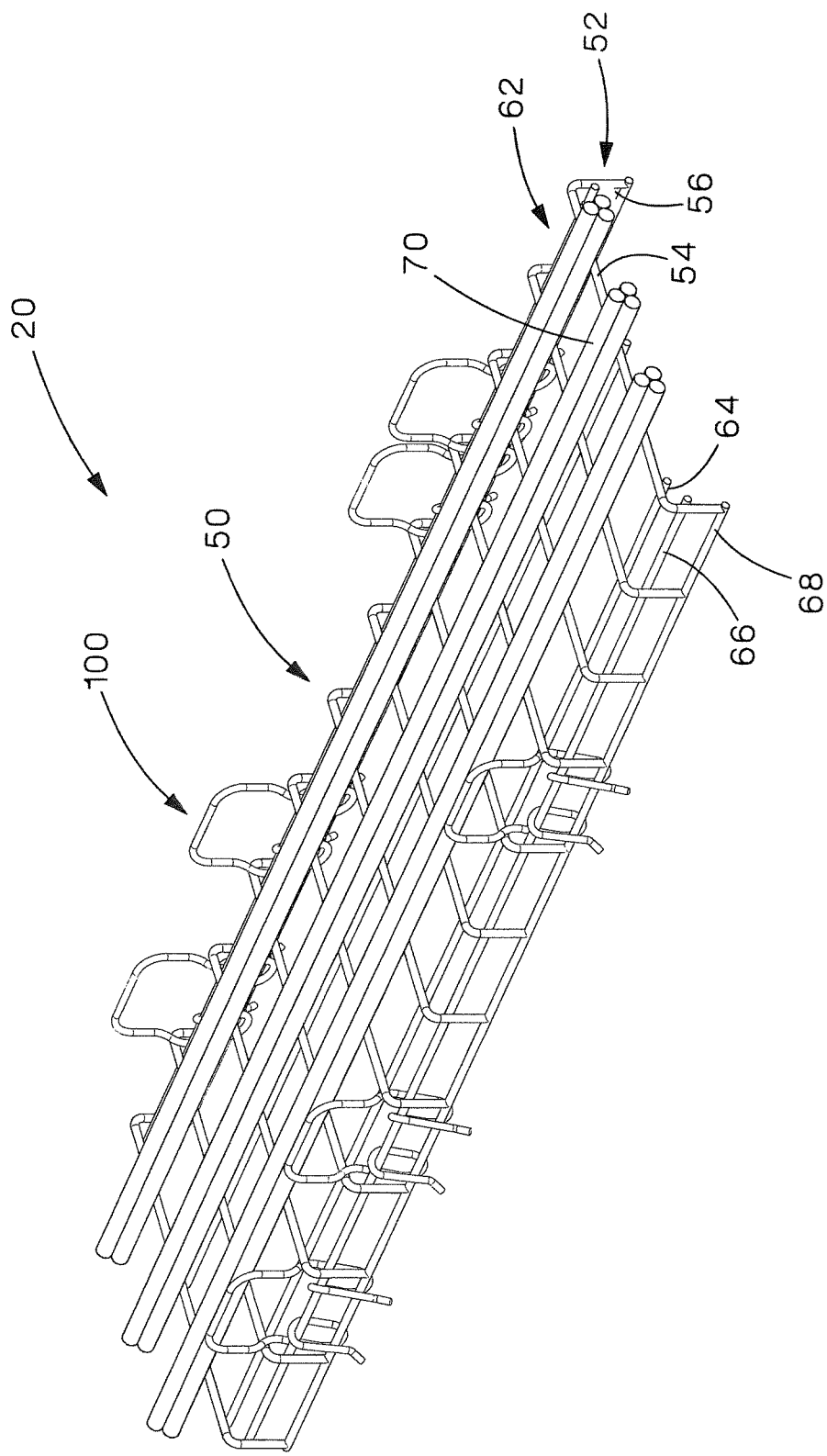
FIG. 1 is a perspective view of a cable tray with the side wall bracket of the present invention.
Figure 3:
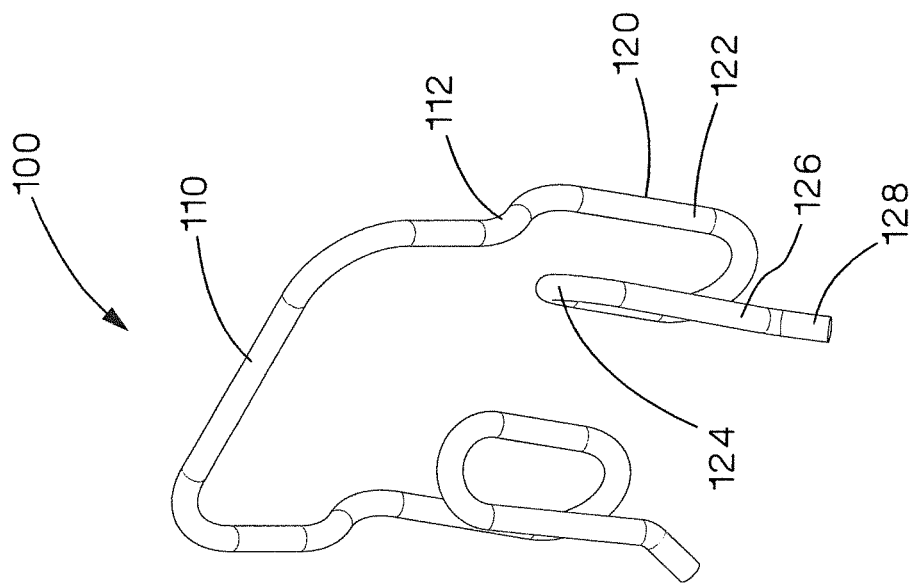
FIG. 3 is a perspective view of the side wall bracket of FIG. 2.
Figure 2:
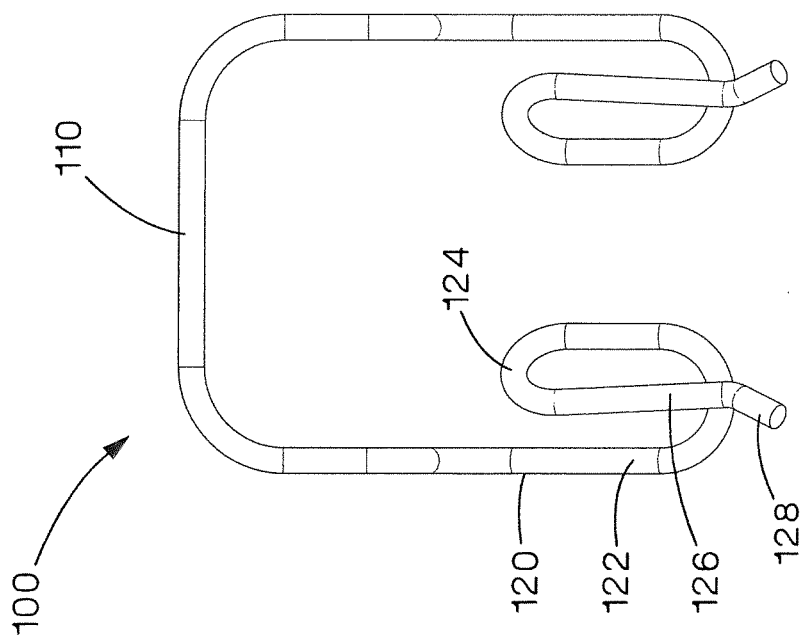
FIG. 2 is a front view of the side wall bracket of FIG. 1.

As discussed above, Applicant's U.S. Patent Pub. Nos. 2011/0284283; 2011/0284701; and 2011/0286785 and U.S. Pat. No. 8,424,814, herein incorporated by reference, describe a cable tray 50 for a cable routing system 20. As illustrated in FIG. 1, the cable tray 50 includes a plurality of transverse wires 52 and a plurality of longitudinal wires 62. The transverse wires 52 include a top portion 54 and downwardly extending side walls 56. The top portion 54 forms a generally flat top for supporting cables routed thereon. Longitudinal wires 64 are positioned underneath the top portion 54 of the transverse wires 52. A side longitudinal wire 66 is positioned adjacent to the inner side of each side wall 56 and a bottom longitudinal wire 68 is positioned at the bottom of each side wall 56.

FIGS. 2-5 illustrate the side wall bracket 100 of the present invention. The side wall bracket 100 is formed from a single piece of wire. The side wall bracket 100 includes an upper loop portion 110 and angled legs 120. The upper loop portion 110 has a first end and a second end. Curved portions 112 extend from the first and second ends of the upper loop portion 110. The curved portions 112 lead to the angled legs 120. Each angled leg includes a U-shaped inside leg portion 122, a hook 124, and an outside leg portion 126. The distal end 128 of the outside leg portions 126 are angled away from the center of the side wall bracket 100. Each hook 124 is designed to engage the side longitudinal wire 66 of the cable tray 50 to secure the side wall bracket 100 to the cable tray 50.

Figure 4:
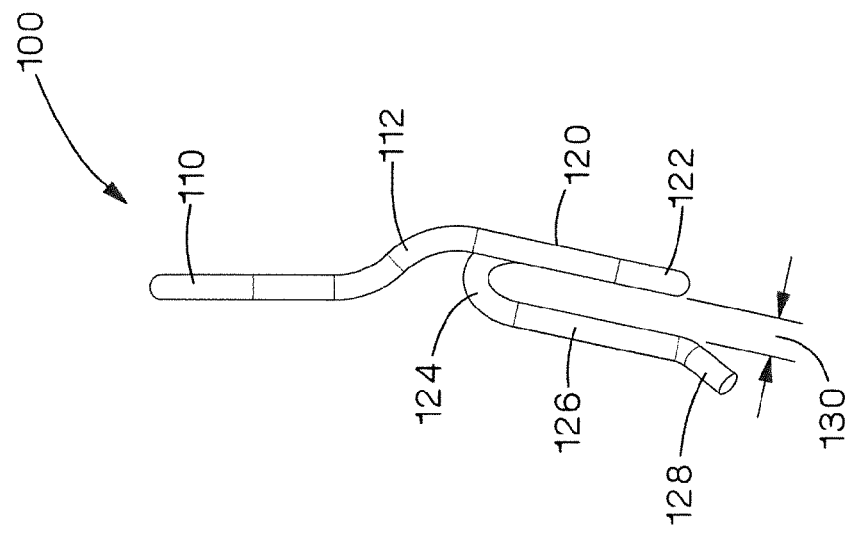
FIG. 4 is a perspective view of the side wall bracket of FIG. 2.
Figure 5:
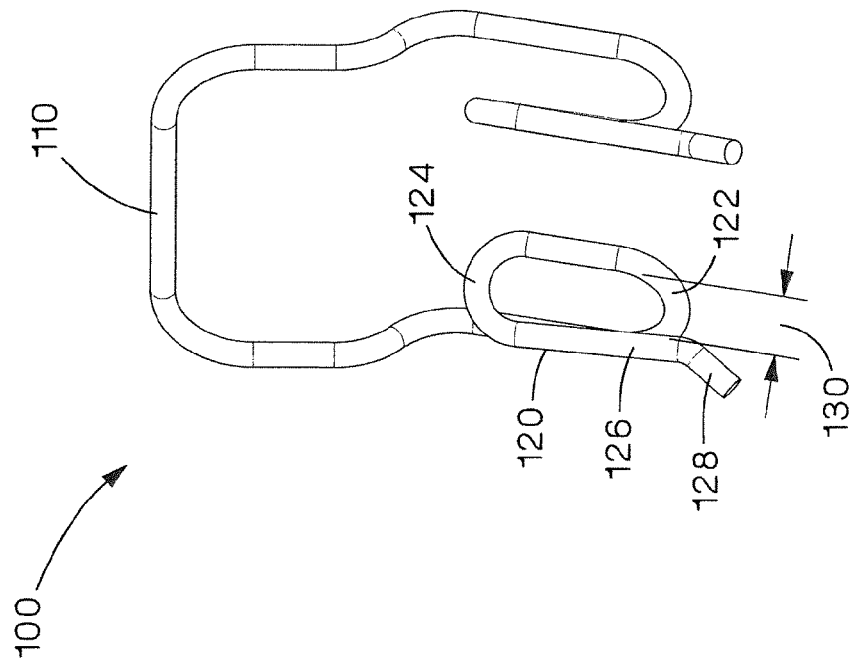
FIG. 5 is a side view of the side wall bracket of FIG. 2.
Figure 6:
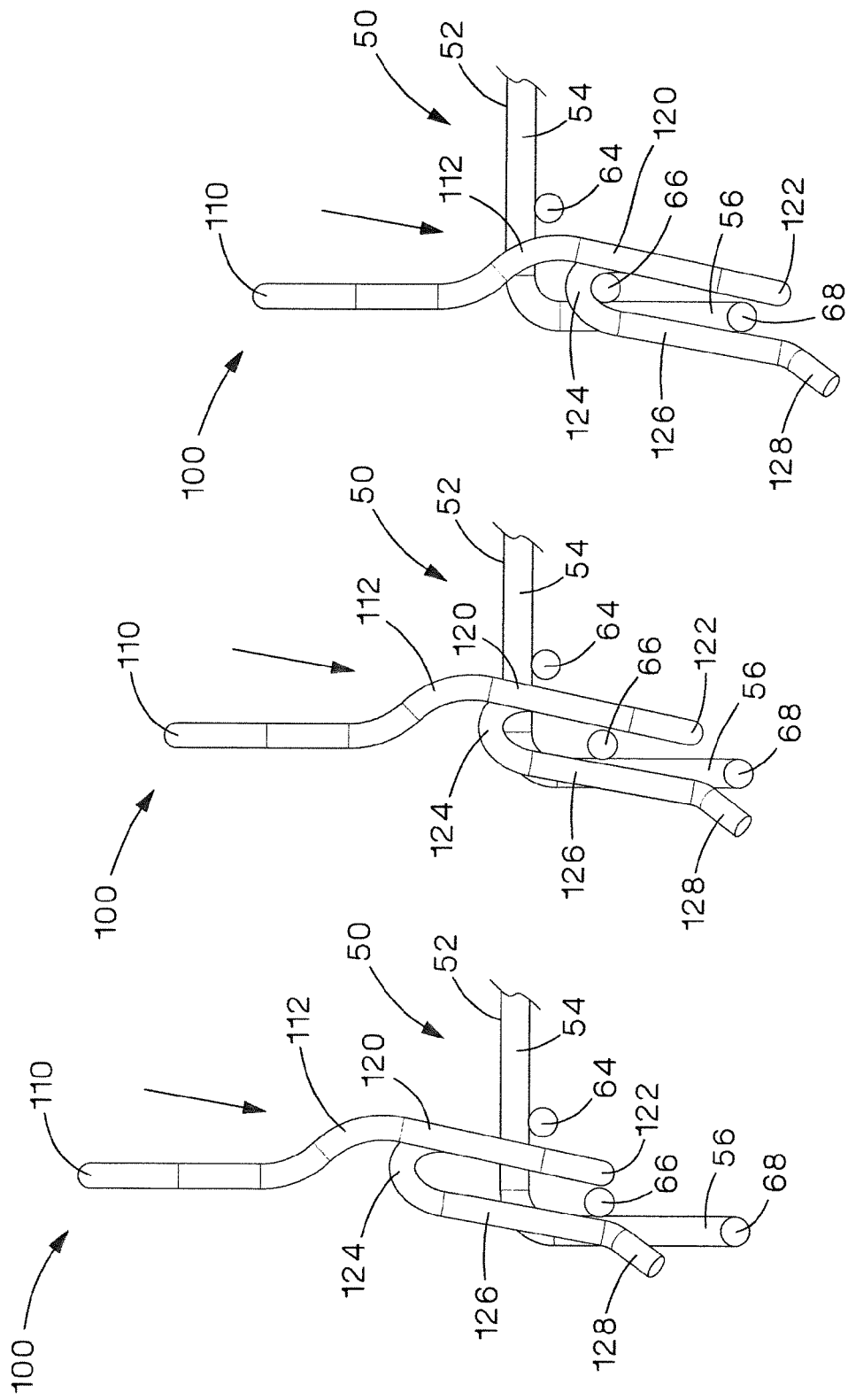
FIG. 6A is a partial end view of the side wall bracket of FIG. 2 being installed on the cable tray.
FIG. 6B is a partial end view of the side wall bracket of FIG. 2 partially installed on the cable tray.
FIG. 6C is a partial end view of the side wall bracket of FIG. 2 installed on the cable tray.
Figure 7:
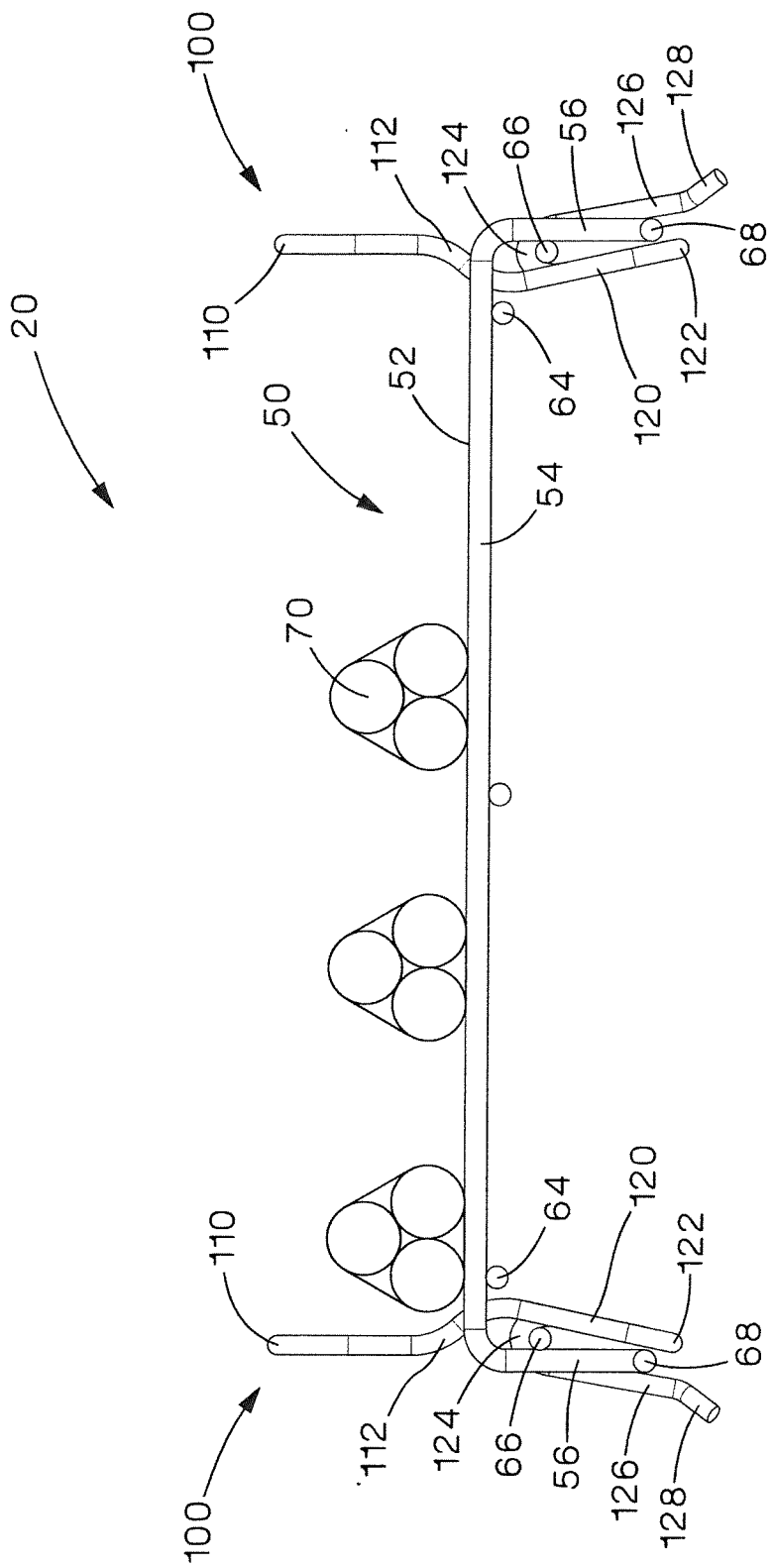
FIG. 7 is an end view of the side wall bracket of FIG. 2 installed on each side of the cable tray.

As illustrated in FIGS. 4 and 5, the angled legs 120 of the side wall bracket 100 enable the hook 124 to be formed with a large radii while maintaining the necessary dimensional opening for the angled legs 120 to keep a firm grip on the side longitudinal wire 66 of the cable tray 50. The large radii hook 124 provides for improved manufacturability of the side wall bracket 100. FIG. 4 illustrates the large radii hook 124 and the leg opening 130 of the side wall bracket 100. FIG. 5 illustrates a side view of the side wall bracket 100 positioned in an installed position without the cable tray. In the installed position, as illustrated in FIG. 6C and FIG. 7, the upper loop portion 110 extends vertically in a plane perpendicular to the cable tray and the angled legs 120 of the side wall bracket 100 are positioned at a 45 degree angle with respect to the cable tray 50. As such, the dimensions of the larger radii hook 124 and the leg opening 130 appear smaller when the side wall bracket 100 is in an installed position.

FIGS. 1 and 6-8 illustrate the side wall bracket 100 of the present invention and the cable tray 50. FIGS. 6A-6C illustrate the side wall bracket 100 being installed on the cable tray 50. The side wall bracket 100 is positioned such that the hook 124 is aligned with the side longitudinal wire 66. As indicated by the arrows in FIGS. 6A-6C, the side wall bracket 100 is pushed downward until the side wall bracket 100 snap locks onto the side longitudinal wire 66 of the cable tray 50. As illustrated in FIG. 6C, the inside leg portion 122 is positioned behind the downwardly extending side wall 56 of the cable tray 50 and the outside leg portion 126 is positioned in front of the downwardly extending side wall 56 of the cable tray 50. Thus, the inside leg portion 122 engages a first surface of the side longitudinal wires 66 and the bottom longitudinal wire 68 and the outside leg portion 126 engages a second surface opposite the first surface of the side longitudinal wire 66 and the bottom longitudinal wire 68 (see FIG. 6C and FIGS. 7-9).

FIG. 7 illustrates the side wall bracket 100 of the present invention installed on each side of the cable tray 50. The side wall brackets 100 prevent the wire bundles 70 routed on the cable tray 50 from inadvertently falling off of the cable tray 50.

As illustrated in FIG. 8, a side wall bracket 100 of the present invention is installed on the cable tray 50 between two transverse wires 52 of the cable tray 50. The side wall bracket 100 may be attached anywhere along the downwardly extending side walls 56 of the cable tray 50. The inside legs 122 and the outside legs 126 are offset to allow the side wall bracket 100 to maintain a firm grip on the cable tray 50. This enables the side wall bracket 100 to be installed or removed, when necessary, without an excessive amount of force.

As illustrated in FIG. 9, an alternative side wall bracket 200 is installed on the cable tray 50. The alternative side wall bracket 200 includes an upper loop portion 210 with a curved portion 212 that leads to angled legs 220. Each angled leg 220 includes a U-shaped inside leg portion 222, a hook 224, and an outside leg portion 226. The distal end 228 of each outside leg portion 226 is angled inward towards a center of the side wall bracket 200.

The side wall bracket of the present invention is easily installed on the cable tray, where desired, to retain the plurality of cables routed on the cable tray.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation.

The invention claimed is:

1. A cable tray and at least one side wall bracket secured to the cable tray for retaining cables routed on the cable tray, the cable tray and side wall bracket combination comprising:
    a cable tray having a plurality of transverse wires including a top portion and downwardly extending side walls, a plurality of longitudinal wires, wherein the longitudinal wires are underneath the top portion, side longitudinal wires and bottom longitudinal wires;
    at least one side wall bracket having an upper loop with a first end and a second end;
    curved portions extending from the first end and the second end of the upper loop;
    an angled leg extending from the curved portions, the angled legs are defined by a U-shaped inside leg portion and a hook that leads to an outside leg portion; and
    wherein the inside leg portion of each angled leg engages a first surface of the side longitudinal wires and the bottom longitudinal wires and the outside leg portion of each angled leg engages a second surface opposite the first surface of the side longitudinal wires and the bottom longitudinal wires to secure the at least one side wall bracket to the cable tray,
    whereby the at least one side wall bracket is installed on the cable tray such that the upper loop of the at least one side wall bracket extends above the top portion of the cable tray to assist in retaining the cables on the cable tray.

2. The cable tray and side wall bracket combination of claim 1, wherein each hook is U-shaped, the U-shaped inside leg portions and the U-shaped hooks extend in directions opposite each other.

3. The cable tray and side wall bracket combination of claim 1, wherein the inside leg portions are parallel to the outside leg portions.

4. The cable tray and side wall bracket combination of claim 1, wherein the inside leg portions and the outside leg portions are offset to allow the at least one side wall bracket to maintain a firm grip on the cable tray.

5. The cable tray and side wall bracket combination of claim 1, wherein the outside leg portions having a distal end, wherein each distal end of the outside leg portions are angled away from a center of the at least one side wall bracket.

6. The cable tray and side wall bracket combination of claim 1, wherein the outside leg portions having a distal end, wherein each distal end of the outside leg portions are angled inward towards a center of the at least one side wall bracket.

7. The cable tray and side wall bracket combination of claim 1, wherein each hook, outside leg portion and inside leg portion define a leg opening that grips one of the side longitudinal wires of the cable tray.

8. The cable tray and side wall bracket combination of claim 1, wherein the upper loop portion of the installed at least one side wall bracket extends vertically in a plane perpendicular to the cable tray.

9. The cable tray and side wall bracket combination of claim 1, wherein the angled legs of the installed at least one side wall bracket are positioned at a 45 degree angle with respect to the cable tray.

* * * * *